(12) United States Patent
Hills et al.

(10) Patent No.: US 7,545,076 B1
(45) Date of Patent: Jun. 9, 2009

(54) SYSTEM AND METHOD FOR TRACKING DRIVE FREQUENCY OF PIEZOELECTRIC MOTOR

(75) Inventors: Chris Hills, Layton, UT (US); Gene Payne, Salt Lake City, UT (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 140 days.

(21) Appl. No.: 11/485,640

(22) Filed: Jul. 11, 2006

Related U.S. Application Data

(60) Provisional application No. 60/698,513, filed on Jul. 11, 2005.

(51) Int. Cl.
*H01L 41/113* (2006.01)
*H02N 2/14* (2006.01)

(52) U.S. Cl. ...................... 310/317; 310/339
(58) Field of Classification Search ........... 310/317, 310/339
See application file for complete search history.

(56) References Cited

U.S. PATENT DOCUMENTS

| | | | |
|---|---|---|---|
| 4,400,641 A | 8/1983 | Vishnevsky et al. |
| 4,453,103 A | 6/1984 | Vishnevsky et al. |
| 4,562,373 A | 12/1985 | Tokusima et al. |
| 4,613,782 A | 9/1986 | Mori et al. |
| 4,622,483 A | 11/1986 | Staufenberg, Jr. et al. |
| 4,727,278 A | 2/1988 | Staufenberg, Jr. et al. |
| 4,743,792 A | 5/1988 | Ueyama |
| 4,755,705 A | 7/1988 | Holum |
| 4,786,836 A | 11/1988 | Tokushima |
| 4,814,660 A | 3/1989 | Yamada et al. |
| 4,831,306 A | 5/1989 | Staufenberg, Jr. et al. |
| 4,857,791 A | 8/1989 | Uchino et al. |
| 4,912,351 A | 3/1990 | Takata et al. |
| 4,933,590 A | 6/1990 | Inoue et al. |
| 4,947,076 A | 8/1990 | Kumada |
| 4,959,580 A | 9/1990 | Vishnevsky et al. |
| 4,965,482 A | 10/1990 | Ohnishi et al. |
| 4,997,177 A | 3/1991 | Mori et al. |
| 5,027,028 A | 6/1991 | Skipper |
| 5,036,245 A | 7/1991 | Ohnishi et al. |
| 5,051,647 A | 9/1991 | Uchikawa et al. |
| 5,087,852 A | 2/1992 | Culp |
| 5,089,740 A | 2/1992 | Ono |
| 5,144,187 A | 9/1992 | Culp |
| 5,166,572 A | 11/1992 | Ohnishi |
| 5,245,243 A | 9/1993 | Ohnishi et al. |
| 5,453,653 A | 9/1995 | Zumeris |
| 5,563,465 A | 10/1996 | Nakahara et al. |
| 5,616,980 A | 4/1997 | Zumeris |
| 5,640,063 A | 6/1997 | Zumeris et al. |

(Continued)

*Primary Examiner*—Quyen Leung
*Assistant Examiner*—Derek J Rosenau
(74) *Attorney, Agent, or Firm*—Thorpe North & Western LLP

(57) ABSTRACT

A system and method for actively tracking a drive frequency of a piezoelectric motor is disclosed. A drive voltage can be applied at a drive frequency to an active piezoelectric element in the piezoelectric motor. A voltage response can be induced in a passive piezoelectric element that is mechanically coupled to the active piezoelectric element to movably engage the passive piezoelectric element at a voltage response frequency. A phase difference can be determined between the drive frequency and the voltage response frequency. The drive frequency of the active piezoelectric element can be adjusted until the phase difference is within a predetermined parameter.

20 Claims, 15 Drawing Sheets

U.S. PATENT DOCUMENTS

| | | |
|---|---|---|
| 5,714,833 A | 2/1998 | Zumeris |
| 5,777,423 A | 7/1998 | Zumeris |
| 5,780,957 A | 7/1998 | Oliver et al. |
| 6,147,436 A | 11/2000 | Claeyssen et al. |
| 6,201,340 B1 | 3/2001 | Matsuda et al. |
| 6,373,170 B1 | 4/2002 | Hills |
| 6,617,757 B2 * | 9/2003 | Vazquez Carazo et al. .. 310/317 |
| 2001/0022486 A1 * | 9/2001 | Shibatani .................... 310/328 |
| 2004/0013420 A1 * | 1/2004 | Hara ........................... 396/55 |
| 2005/0134562 A1 * | 6/2005 | Grant et al. ................. 345/161 |
| 2007/0188048 A1 * | 8/2007 | Nagahama et al. ..... 310/316.01 |

* cited by examiner

SYSTEM AND METHOD FOR TRACKING DRIVE FREQUENCY OF PIEZOELECTRIC MOTOR

CROSS-REFERENCE TO RELATED APPLICATIONS AND CLAIM OF PRIORITY

Priority of U.S. Provisional patent application 60/698,513 filed Jul. 11, 2005 is claimed and incorporated by reference herein in its entirety.

BACKGROUND

The present invention relates generally to piezoelectric motors. More particularly, the present invention relates to a piezoelectric motor coupled to a driver configured to compensate for temperature and voltage variations, and to tune to a predetermined drive frequency and a selected power output.

Accurate micro-positioning and actuation are often required in certain applications, such as slide positioning systems. Piezoelectric drivers have been utilized to replace leadscrews and gears typically used in such slide positioning systems. The piezoelectric drivers use a piezoelectric material to convert an electrical field applied to the piezoelectric material to mechanical displacement, or a dimensional change in the piezoelectric material. Thus, the piezoelectric material may be affixed to a first member, such as the base of a slide, and engage or bear against a second member, such as the platform of the slide. The piezoelectric material may be oriented such that the dimensional change, or expansion and contraction, of the piezoelectric material due to the applied electrical field causes the second member to move with respect to the first member.

Some piezoelectric motors use a pair of engaging elements which are selectively clamped to translate a housing relative to a separate member. The piezoelectric driving elements are each coupled to one of the engaging elements. The piezoelectric driving elements selectively expand and contract in response to an applied voltage of selected magnitude and frequency. Thus, the piezoelectric driving elements produce a variable driving force between the housing and the engaging elements, and which is conducted through the engaging elements to apply a variable clamping force to the separate member. The engaging elements are responsive to the expansion and contraction of the piezoelectric driving elements to selectively inhibit and impart relative motion between the housing and the separate member to produce motion.

Some advantages of piezoelectric motors include precise positioning (i.e. nanometer precision), efficiency, lack of backlash, and quiet operation. However, despite these advantages, several disadvantages still exist with piezoelectric motors, and other commercially available micro-motors.

Piezoelectric motors are actuated by microprocessor drivers that control power magnitude and frequency to the motor. Each piezoelectric motor has a resonant frequency at which performance is optimized, and thus each driver and motor (or motor set) must be tuned to its resonant frequency after installation into an application. This tuning is typically accomplished by manually calibrating the output frequency and voltage magnitude of the motor. Manual calibration is tedious, time consuming and prone to human error resulting in less than optimal performance by the motor.

Additionally, piezoelectric motors often need retuning during or after use. Temperature and voltage changes can affect the optimal resonant frequency of operation. Consequently, retuning is required to ensure optimum performance of the motor.

Another disadvantage is that power levels must be tuned according to the number of motors being driven in parallel. Thus, changing the number of motors being driven requires recalibration of the driver.

SUMMARY

A system and method for actively tracking a drive frequency of a piezoelectric motor is disclosed. A drive voltage can be applied at a drive frequency to an active piezoelectric element in the piezoelectric motor. A voltage response can be induced in a passive piezoelectric element that is mechanically coupled to the active piezoelectric element to movably engage the passive piezoelectric element at a voltage response frequency. A phase difference can be determined between the drive frequency and the voltage response frequency. The drive frequency of the active piezoelectric element can be adjusted until the phase difference is within a predetermined parameter.

The invention provides a piezoelectric motor driver for driving a piezoelectric motor. An exemplary motor includes a head to movably engage the separate member, and one or more piezoelectric blocks coupled to the head. The piezoelectric blocks selectively expand and contract in response to an applied electric field to displace the head and the separate member. An electrode extends between the head and the piezoelectric blocks to apply the electric field. The motor can include a housing fixed with respect to the separate member, and a mounting block movably connected to the housing and affixed to the piezoelectric block.

The motor can be actuated by a piezoelectric motor driver that is coupled to the piezoelectric motor. The driver can be configured to automate compensation for temperature and voltage variations, tune to a resonant frequency, and calibrate power output.

In accordance with another aspect of the invention, the driver can have a communication port that can allow control of the driver and motor via a digital controller, such as a computer. The communication port and digital controller can allow control of a plurality of piezoelectric motors.

Additional features and advantages of the invention will be set forth in the detailed description which follows, taken in conjunction with the accompanying drawing, which together illustrate by way of example, the features of the invention.

DETAILED DESCRIPTION

Figure 1:
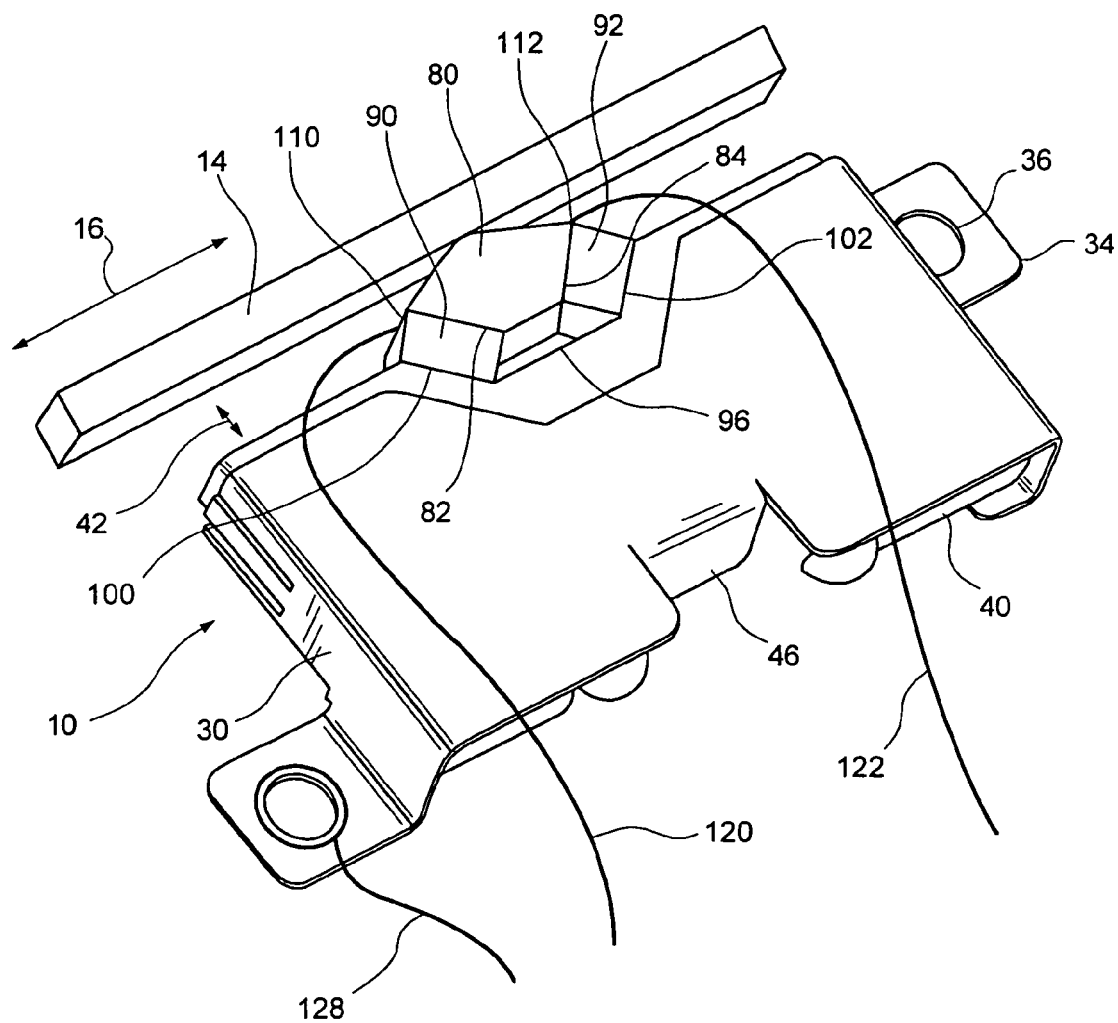
FIG. 1 is a perspective view of a piezoelectric motor in accordance with the present invention, shown driving a separate member.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The invention provides a piezoelectric motor driver for driving a piezoelectric motor. Such a motor may be utilized for a slide having a base and a platform movably disposed on the base as described in U.S. Pat. Nos. 4,622,483, to Staufenberg, Jr. et al and 6,373,170, to Hill, which are incorporated by reference in their entirety for all purposes herein. This new driver provides self-tuning operation to accommodate for motor-to-motor frequency differences and active frequency tracking for use in a much larger temperature range than previously available.

Figure 2:
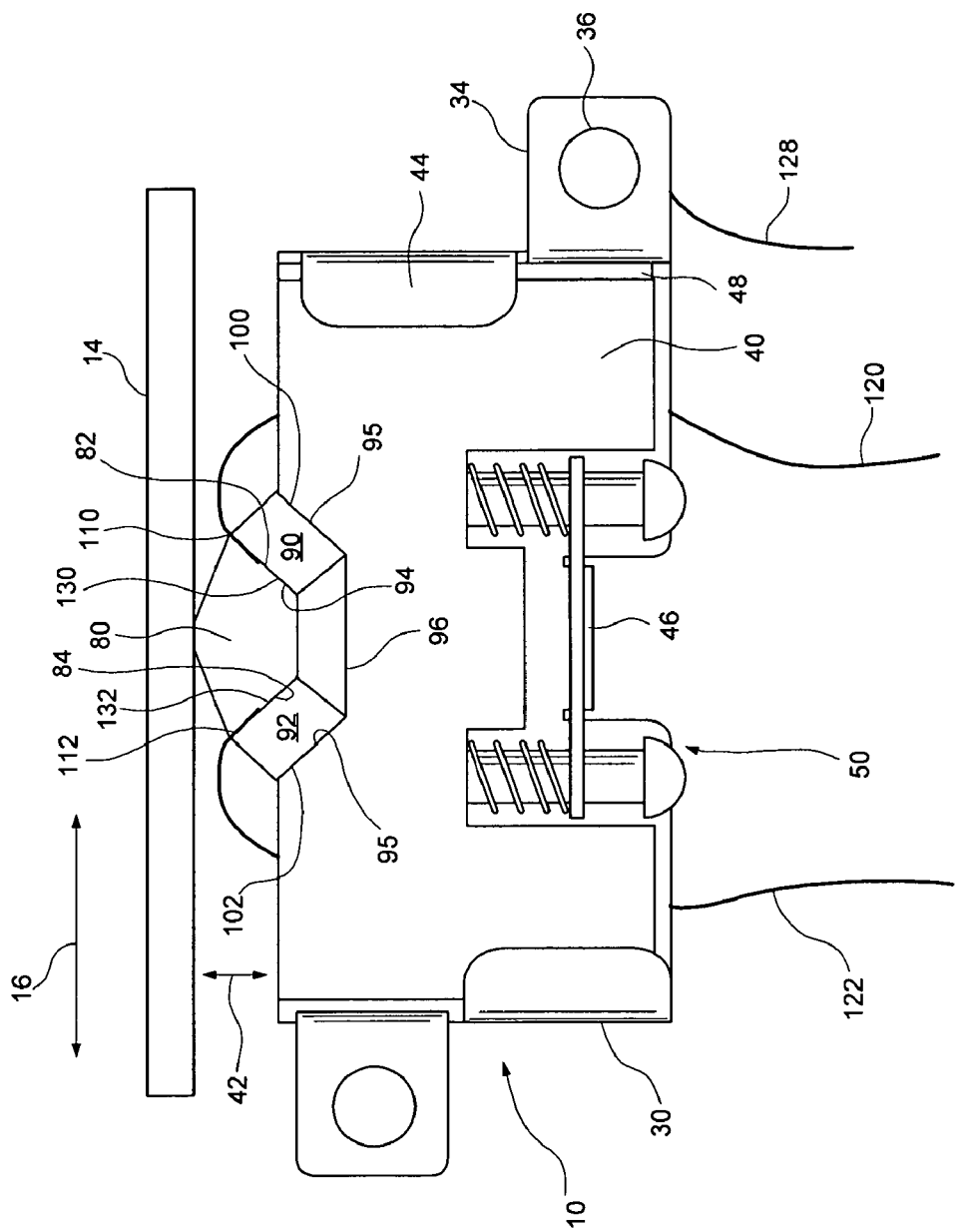
FIG. 2 is a bottom view of the piezoelectric motor in accordance with the present invention, shown driving the separate member.

As described in U.S. Pat. No. 6,373,170, and as illustrated in FIGS. 1 and 2, a piezoelectric motor, indicated generally at 10, in accordance with the present invention is shown for driving a separate member, indicated generally at 14, along a path of travel, indicated by arrow 16. Micro-positioning and actuation are examples of fields which may benefit from use of such a motor 10 for imparting accurate, incremental displacement and/or force. For example, referring to FIG. 4, the motor 10 may be utilized with a slide positioning system 18 which have a fixed base 22, and a platform 26 movably disposed on the base 22. The motor 10 of the present invention may be affixed to the base 22 of such a slide 18, while the separate member 14 may be affixed to the platform 26, or vice versa, to displace the platform 26 on the base 22, indicated by arrow 28. It will be appreciated that the separate element 14 may be a separate component, or an integral component, of the object being driven, such as the slide 26. It will also be appreciated that either the motor 10 or the separate member 14 may be affixed to either a fixed object or a moving object.

Figure 4:
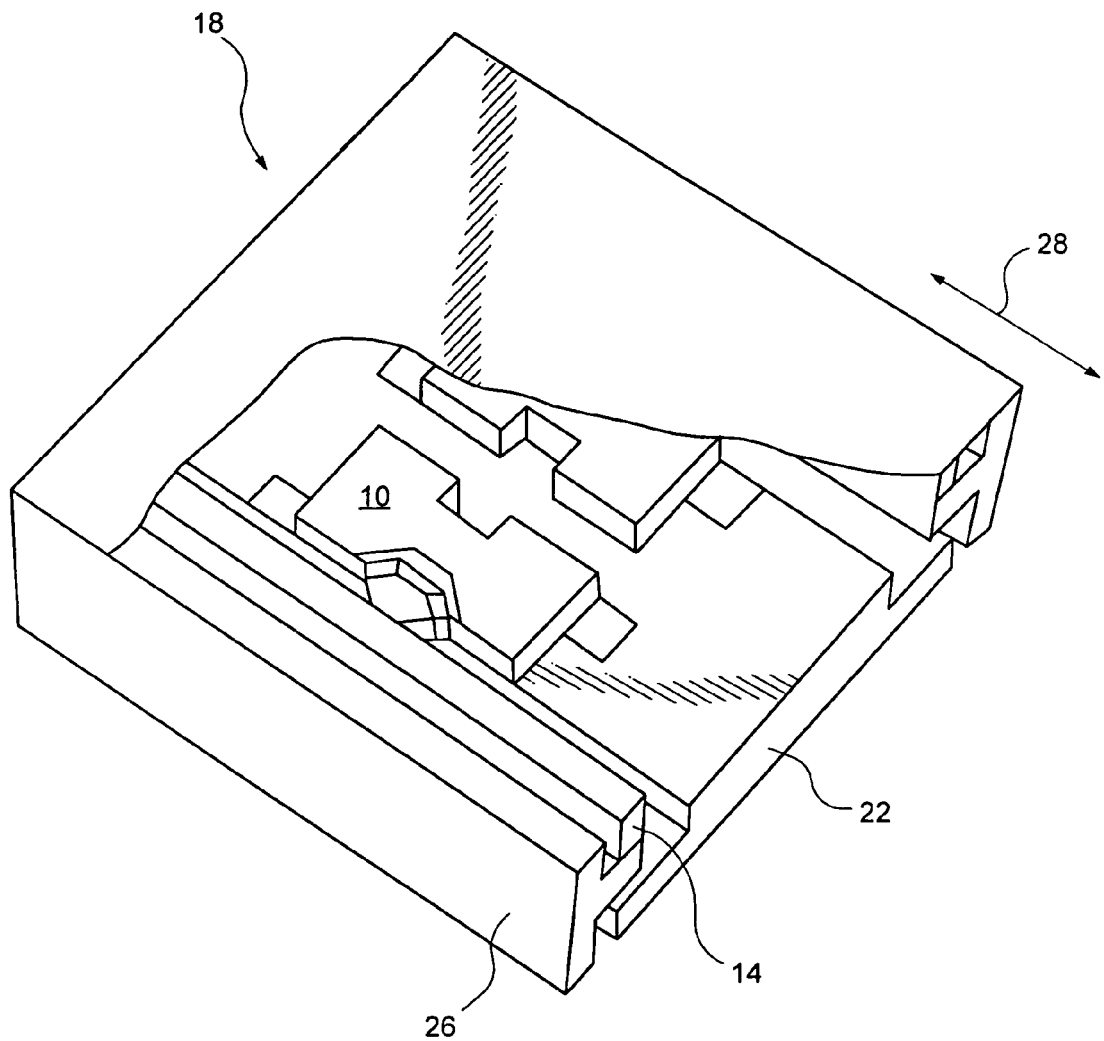
FIG. 4 is a perspective view, partially removed, of an exemplary application of a slide positioning system with the piezoelectric motor in accordance with the present invention.

Referring again to FIGS. 1 and 2, the motor 10 includes a housing 30 which is fixed with respect to the separate member 14. The housing 30 may be fixed to an object, such as the base 22 of a slide 18 as shown in FIG. 4. Thus, the housing 30 may have flanges 34 with apertures 36 to receive screws, rivets, or the like, to secure the housing 30. The housing 30 may be stamped sheet metal shaped to form the housing 30. The housing 30 is open at a side facing the separate member 14, and closed, or forming retaining flanges, at the remaining sides and ends, as discussed more fully below.

A mounting block 40 is movably disposed in the housing 30, and thus movable with respect to both the fixed object, such as the base 22 of the slide 18 in FIG. 4, and the separate member 14, indicated by arrow 42. Flanges 44 and 46 (FIG. 2) are formed in the housing 30 to retain the mounting block 40 in the housing 30. The housing 30 limits movement of the mounting block 40 to a substantially linear movement path and direction, also indicated by arrow 42, which is substantially orthogonal to the separate member 14, and the direction of travel 16 of the separate member 14. A low friction material 48 (FIG. 2) may be disposed between the mounting block 40 and housing 30 to reduce friction therebetween, and to facilitate a sliding motion.

The mounting block 40 preferably has substantial mass compared to the piezoelectric blocks and acts as a solid base or relatively fixed mass against which the piezoelectric blocks may push, as discussed more fully below. In addition, the mounting block 40 controls the orientation of the piezoelectric blocks, as discussed below.

A head or engaging element 80 is coupled to the mounting block 40 and housing 30, and thus the fixed object (such as the base 22 of the slide 18 in FIG. 4), and movably engages the separate member 14. The head 80 has opposite first and second surfaces 82 and 84.

A pair of piezoelectric blocks 90 and 92 are affixed to the mounting block 40 and coupled to the head 80. Each piezoelectric block 90 and 92 has opposite first and second surfaces 94 and 95, with the first surface 94 attached to the first surface 82 of the head 80, and the second surface 95 affixed to the mounting block 40. The mounting block 40 has an indentation 96 formed therein with opposite surfaces or walls 100 and 102 oriented at an angle, such as a 45 degree angle, to the separate member 14, or direction of travel 16 of the separate member 14. A first piezoelectric block 90 is affixed to a first wall 100 of the indentation 96 while a second piezoelectric block 92 is affixed to a second wall 102 of the indentation 96 with the head 80 disposed between the two piezoelectric blocks 90 and 92.

The piezoelectric blocks 90 and 92 are rectangular or square blocks of piezoelectric material, such as a ceramic material, which responds to an applied electric field with dimensional changes. For example, a variable voltage applied to the piezoelectric blocks 90 and 92 causes the piezoelectric material to expand and contract in a vibrational manner proportional with a frequency of the applied voltage. It will be appreciated that such expansion and contraction results in displacement of the second surfaces of the blocks 90 and 92, the head 80 attached to the blocks 90 and 92, and thus separate member 14 engaged by the head 80. The electric field or voltage preferably is applied around a resonant frequency of the motor 10. In one embodiment, a resonant frequency of the motor can be about 130 KHz±15 KHz. The actual resonant frequency of the motor is dependent on a variety of factors, including but not limited to, the type of piezoelectric material used, the size of the piezoelectric material, and the temperature of the piezoelectric material. A resonant frequency can vary widely, from at least 20 KHz to well over 350 KHz.

The pre-load mechanism 50 applies a force to the head 80, through the mounting block 40 and piezoelectric blocks 90 and 92, to force or bias the head 80 against the separate member 14. This force is directed linearly in a direction 42 orthogonal to the separate member 14, as opposed to arcuately or pivotally, to reduce uneven wear. As the piezoelectric blocks 90 and 92 expand and contract, the force applied to the head 80 against the separate member 14 is respectively increased and decreased, and the head 80 displaces respectively towards and away from the separate member 14 partially in the direction of travel. For example, as the first piezoelectric block 90 is operated, displacement of the separate member 14 towards the left occurs (with respect to FIG. 1). Similarly, as the second piezoelectric block 92 is operated, displacement of the separate member 14 towards the right occurs (with respect to FIG. 1).

As the piezoelectric blocks 90 and 92 expand and contract, they push and pull against both the head 80 and the mounting block 40. Thus, the mounting block 40 preferably has a large mass. In addition, the mounting block 40 is held against lateral movement by the housing 30. The low friction material 48 also may fill any space between the mounting block 40 and the housing 30 so that the mounting block 40 fits snugly, at least laterally, within the housing 30.

Further details of the operation of piezoelectric motors are disclosed in U.S. Pat. No. 4,622,483, to Staufenberg, Jr. et al, which is herein incorporated by reference.

First and second electrodes 110 and 112 are disposed between the head 80 and respective first and second piezoelectric blocks 90 and 92. The electrodes 110 and 112 apply an electric field, such as an AC charge or voltage, to the piezoelectric blocks 90 and 92. First and second wires 120 and 122 are coupled to respective first and second electrodes 110 and 112 to carry electrical signals to the electrodes 110 and 112. The housing 30 and mounting block 40 are preferably metal, or another conductive material, so that a ground wire 128 may be coupled to the housing 30, and thus the piezoelectric blocks 90 and 92. Thus, each piezoelectric block 90 and 92 has one end coupled to the electrodes 110 and 112 and wires 120 and 122, and another end coupled to the ground wire 128 through the mounting block 40 and housing 30. The electrical signals or the applied electric field may be controlled to selectively operate the piezoelectric blocks 90 and 92, and thus selectively control the displacement of the separate member 14, such as direction, speed, distance, etc.

Figure 3:
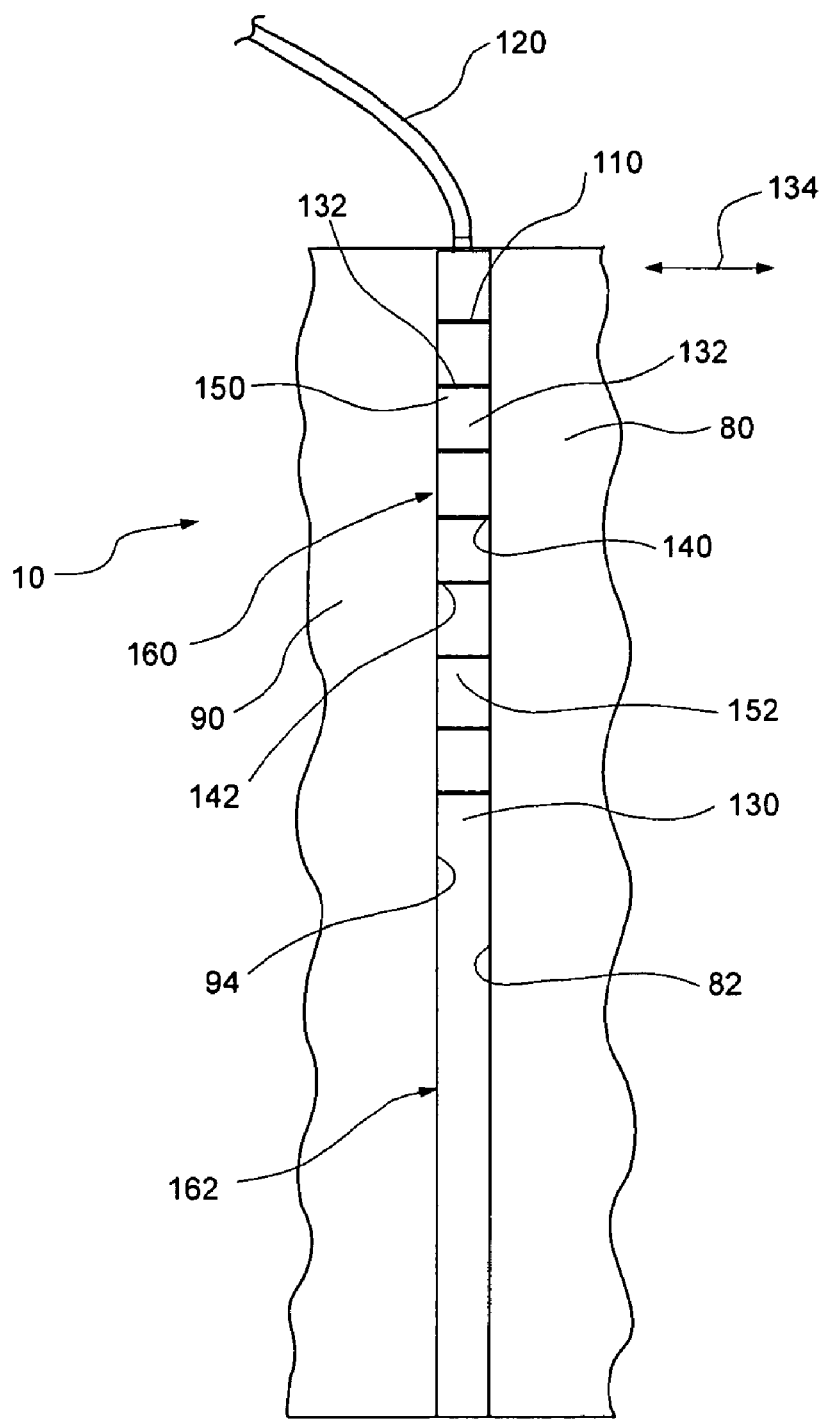
FIG. 3 is a detailed partial view of a joint or interface between a head and piezoelectric block in accordance with the present invention.

Referring to FIG. 3, a joint or interface 130 between one of the piezoelectric blocks 90 and the head 80 is shown, which is exemplary of both first and second joints or interfaces 130 and 132 between the head 80 and the respective first and second piezoelectric blocks 90 and 92. The electrode 110 is disposed between the piezoelectric block 90 and the head 80. The electrode 110 may be attached to the head 80 by an adhesive, as discussed in greater detail below.

In accordance with another aspect of the present invention, the electrode 110 advantageously is a mesh material which extends between the piezoelectric block 90 and the head 80 to form a rigid structure 132 which displaces, indicated by arrow 134, as the piezoelectric block 90 expands and contracts. Thus, the expansion and contraction of the piezoelectric block 90 is transferred to the head 80. The electrode 110 has opposite surfaces including a first electrode surface 140 which preferably substantially contacts the first head surface 82 of the head 80, and a second electrode surface 142 which preferably substantially contacts the first surface 94 of the piezoelectric block 90. Thus, the electrode 110 preferably directly contacts both the head 80 and the piezoelectric block 90 to provide stiffness, and increase efficiency. Such direct contact of the electrode 110 is a significant improvement over prior art motors in which the electrode, or head and piezoelectric material, float on a layer of epoxy.

In addition, the electrode 110 has a plurality of apertures or perforations 150 formed there through creating spaces 152 between the piezoelectric block 90 and the head 80. An adhesive is disposed in the spaces 152 of the electrode 90 to adhere the head 80 to the piezoelectric block 90. Thus, the adhesive may bond to the surfaces 82 and 94 of the head 80 and piezoelectric block 90, without interfering with the contact between the electrode surfaces 140 and 142. Therefore, the apertures 150 in the electrode 110 advantageously allow the electrode 110 to be disposed between the head 80 and the piezoelectric block 90, and the head 80 to be adhered to the piezoelectric block 90, while the electrode 110 forms the solid structure 132 between the head 80 and piezoelectric block 90. The head 80 and piezoelectric block 90 are spaced-apart by the interface 130 a distance defined by the thickness of the electrode 110. Thus, the electrode 110 also serves to control the bond thickness which results in more consistent performance. It is believed that the direct contact and lack of epoxy layers results in a stiffer and more efficient motor. The uniform and consistent bond thickness, and direct contact of the electrode 110, are significant improvements over prior art motors with inconsistent bonds.

In accordance with another aspect of the present invention, the interface 130 advantageously has two zones, including a first rigid zone 160 and a second compliant zone 162, which is more compliant or flexible than the rigid zone 160. Each of the zones 160 and 162 comprises part of the interface 130 between the piezoelectric block 90 and the head 80. The rigid zone 160 is more rigid than the compliant zone 162 and displaces as the piezoelectric block 90 expands to transfer the expansion to the head 80. The compliant zone 162 complies or flexes as the opposite, or second, piezoelectric block 92 expands. It will be appreciated that the piezoelectric blocks 90 and 92 are disposed on opposite sides of the head 80, and thus expand partially against one another. Thus, the compliant zone 162 allows the head 80 to move somewhat with respect to one piezoelectric block 90 while the opposite piezoelectric block 92 expands.

The rigid zone 160 may be formed by the electrode 90 extending between the head 80 and piezoelectric block 90 in the interface 130. The rigid and compliant zones 160 and 162 preferably each form a half of the interface 130. Thus, the electrode 90 preferably extends partially, or half way, into interface 130.

Although it is believed that stiffening the motor 10 through control of the bond joint or interface 130, and direct contact between the electrode 110 and the head 80 and piezoelectric block 90, results in greater efficiency, it is also believed that such stiffness also results in high stress points and premature failure of the motor 10. Thus, the compliant zone 162 is located at areas believed to be high stress areas of the interface 130, or at the inside corners of the joints. It is believed that the compliant zone 162, or layer of adhesive, allows for stress and strain relief during motor operation, resulting in increased efficiency and longer life. In addition, stiffening of the motor 10 resulted in higher resonant frequencies, beyond the desired resonant frequency of approximately 130 KHz. The addition of the compliant zone 162 resulted in reduction in resonant frequency of the stiffer motor back to the desired range of about 130 KHz.

The above described piezoelectric motor 10 resulted in an increase in displacement rate of the separate member 14 from about 4 in/sec with an applied voltage of 600 V (peak-to-peak), to approximately 10 in/sec at 500 V (peak-to-peak). Thus, the improved piezoelectric motor 10 requires less energy and results in much greater displacement. In addition, the improved piezoelectric motor 10 has been found to have an increase in service life up to three times.

Figure 5:
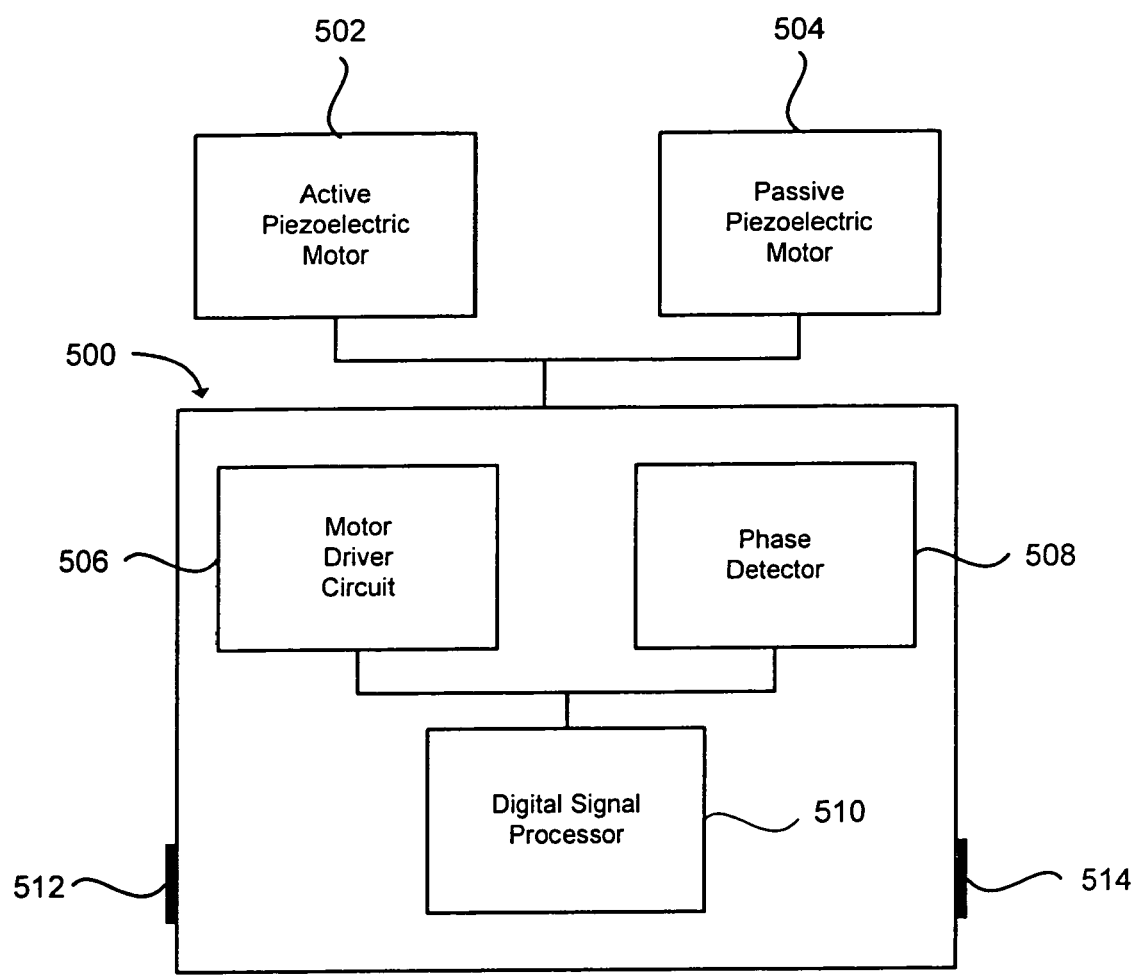
FIG. 5 is a diagram of a piezoelectric motor driver and motor in accordance with an embodiment of the present invention.

Turning to FIG. 5, a piezoelectric motor driver 500 is shown in accordance with an embodiment of the present invention. The piezoelectric motor driver is configured to automate tuning of the piezoelectric motor 10 to compensate for temperature and voltage variations. The driver can self tune to a resonant or selected drive frequency, and automatically calibrate power output.

Specifically, the piezoelectric motor driver 500 can reduce or eliminate the need for manual tuning of drive frequency and voltage levels. As noted above, piezoelectric motors 10 can have a distribution of resonant frequencies dependant upon the physical characteristics of each motor. Therefore, frequency tuning can be required for each motor or motor set. Also, temperature variance can shift the motor resonance and necessitate re-tuning. In addition, the power level can require tuning according to the number of motors being driven in parallel. In previous solutions, each of these tuning steps required manual labor and expensive oscilloscope equipment.

Advantageously, the piezoelectric motor driver 500 of the present invention enables automated tuning of the piezoelectric motor to the resonant frequency or a selected drive frequency of the motor. Additionally, the driver can automate calibration of the power output depending on the number of motors being driven. The driver can also be used to track the drive frequency, in near real-time mode during operation, and can correct for any changes caused by temperature or voltage variations as the piezoelectric motor is used.

Real time correction can be accomplished by determining a phase lag between driven and passive piezoelectric elements. Specifically, active and passive piezoelectric elements 502 and 504, respectively, can be coupled to the piezoelectric motor driver 500. The active piezoelectric element is used to drive the load while the passive element can be used for measurements. As previously mentioned, the active piezoelectric element is the element to which a drive voltage is applied. Thus, the primary 90 or secondary 92 piezoelectric elements of FIG. 2 can be both active or passive, depending on which element is being actively driven. Both elements can be used to drive in opposing directions and consequently are typically not run at the same time. Accordingly, when the primary piezoelectric motor is actuated by applying a drive voltage at a drive frequency the primary piezoelectric motor is the active element and the secondary piezoelectric motor is the passive element.

Similarly, when the secondary piezoelectric element 92 is actuated by applying a drive voltage at a drive frequency, the secondary piezoelectric element is the active element and the primary piezoelectric element 90 is the passive element. Thus, when one of the primary and secondary piezoelectric motors is driven, the other of the primary or secondary piezoelectric motors can be a passive element. The passive element can act as a sensor and send feedback to a digital controller in the piezoelectric motor driver 500.

Near-real time correction can also be accomplished by tracking the lowest impedance of the driven element, or tracking maximum voltage magnitude output from the passive element. However, when a motor 10 has two resonances within a frequency band of interest, and only one is constructive, the active/passive phase lag method can provide a unique solution over the band.

Frequency calibration can be accomplished when power is supplied to the driver 500. In one embodiment, the driver 500 can be used to activate a calibration routine for execution. This calibration routine drives the motor(s) 10 back and forth a very short distance. During this time, the driver 500 can scan the drive frequency through a specified frequency band. Then, a phase lag between the driven piezoelectric element and the passive piezoelectric element (operating as a sensing element) is measured. As noted above, the active and passive elements can trade functions when the motor reverses directions, but the sensing can also be accomplished by using a separate sensing element, independent of the driven element(s). In one embodiment, the optimum phase lag between the active and passive elements can be about 70°. The optimum phase lag can be different for various piezoelectric motors constructed of different materials, geometries or other physical characteristics. An acceptable tolerance can be determined based on the sensitivity of the motor and the type of activity the motor is being used for. For example, the tolerance may be 70°±5°. In another embodiment, a tighter tolerance may be needed to achieve finer velocity control of the motor(s), such as 70°±0.5°. When the measured phase lag between the active and piezoelectric elements is outside the desired tolerance, the drive frequency of the active element can be adjusted to either increase or decrease the phase lag such that it is within the predetermined tolerance. When the phase lag is within an acceptable range the drive frequency is referred to as being tuned.

In one embodiment, the driver 500 can be used to scan the motor over a plurality of steps, or frequency bands, and determine a tuned drive frequency using the calibration algorithm for each of the bands. The tuned drive frequency for each band can be stored in a digital memory for future use.

In another embodiment, the driver 500 can be configured to actively tune the drive frequency as the piezoelectric motor is used. Stored calibration information can become outdated due to changes in temperature, voltage, number of motors used, and such. Actively tuning of the drive frequency can be accomplished by making repeated measurements of the phase lag and adjusting the drive frequency accordingly. Active tuning can be used to enable the motor to remain tuned during prolonged use and over a wide range of temperatures.

After the tuned drive frequency is determined, the calibration routine can sense output voltage as a function of drive effort at a specified frequency. This drive level can then be scaled so that the output voltage correlates to the control input voltage. For example, if the control input is half of full scale, the output is half of the rated voltage of the motor. Thus, if the full scale is 10 volts, when the control input is set at 5 volts, the output can be half of the rated voltage of the motor. Similarly, when the control input is at its maximum, then the output of the motor can be set at a maximum rated voltage for that motor.

As with drive frequency, output voltage can either be calibrated over a plurality of frequency steps and saved in a digital memory for future use, or alternatively, the drive effort can be actively set by the driver 500 while the piezoelectric motor 10 is being used. Both an initial calibration and active adjustments of the frequency and drive voltage can also be used to increase performance and accuracy of the piezoelectric motor 10.

The piezoelectric driver 500 can also compensate for non-linearities found within the motor 10. For example, velocity output of the motor may not track linearly with drive level. Thus, non-linear velocity output can make the motor more difficult to control. The calibration routine or active tuning of the piezoelectric driver can be used to help compensate for motor non-linearities by creating a non-linear voltage output as a function of control input.

Furthermore, when the motor is put to use, the piezoelectric motor driver 500 can recall the calibrated frequency and begin to drive the motor using this frequency. During operation, the driver can continually sense phase lag between the driven element and the passive element. If any changes in phase are detected, the driver can adjust the drive frequency accordingly. This can help ensure substantially constant performance over a wide temperature range, such as between 0 degrees and 85 degrees Celsius.

In one embodiment, the piezoelectric motor driver 500 can include a motor driver circuit 506, a phase detector 508, and a digital signal processor 510. The motor driver circuit can include a motor drive tuning circuit. The tuning circuit can create a resonant point at a desired motor frequency. A MOSFET driver integrated circuit (IC) can be incorporated with inputs that are positive and negative pulse width modulation (PWM) signals. The driver IC can scale these inputs to higher voltages required to drive gates of motor drive transistors. The motor drive transistors can be engaged in a pattern out of phase with respect to each other. The duty cycle of on/off times is selected according to the PWM signals. In one embodiment, this generates a cyclic signal with a 24V peak amplitude. The actual amplitude is dependent on the type of power supply that is used. The power supply can be larger than 24 V to drive a greater number of motors, or motors having larger piezoelectric elements.

The motor driver circuit 506 further comprises a motor drive transformer which can be used to boost the PWM voltage to a 500V peak to peak amplitude in order to drive the piezoelectric elements 502 or 504. A motor drive select circuit can be used to determine a desired direction (i.e. whether to drive the primary or secondary piezoelectric element). The direction input to the circuit can be used to route the motor drive signal to only one of the two piezoelectric motor elements 502 and 504. Two transistors can turn on or off based on the direction input. The input enables only one of two switches to operate at a time. The switches can be optically isolated.

The motor driver circuit 506 further comprises a primary motor zero-cross detector circuit which can produce a high or low digital output based on the polarity of the motor feedback signal from the primary motor. When the primary motor is the non-driven signal, depending on the direction input, the feedback signal can be used for phase feedback. When the primary motor feedback signal is positive, the primary phase output can be logic high. Otherwise, the output is logic low. A secondary motor zero-cross detector operates the same as the primary motor zero-cross detector.

The motor driver circuit 506 further comprises an analog control voltage scaling circuit. A user can command a motor drive effort and direction through the value of this voltage. The input range can be ±10V. The polarity of the signal selects the motor direction, and the magnitude controls intended motor velocity. This circuit can scale the ±10V signal to a range of 0 to 3.3 volts, which is within an acceptable input range of the digital signal processor (DSP) 510.

The motor driver circuit 506 further comprises a motor amplitude scaling circuit. The circuit can scale the motor drive voltage (up to 250V peak) to a range of 0 to −3.3V, which is also within an acceptable range of the DSP 510.

The phase detector 508 includes a phase detector output. In one embodiment, a logic AND gate can be used to combine the outputs of both zero cross detectors. The output of the logic gate is an indication of the relative phase of the channels. The output is compared to the motor drive frequency to determine the phase relationship.

The DSP 510 can read as inputs the three phase signals from the primary and secondary motor zero-cross detectors and the phase detector 508. It also reads the scaled motor voltage and the analog control voltage. The DSP can then generate the positive and negative PWM signals used to drive the active motor. The DSP can also generate the direction output based on the input from the motor drive select circuit. The PWM signals are sent to the transistor driver IC which sends them to the motor drive transistors and motor drive transformer that were previously discuused. A PWM signal having an amplitude of up to 500 V peak to peak is then sent to the selected piezoelectric element. The drive frequency of the PWM signal is tracked by the DSP and adjusted based on the phases of the zero cross detectors and the phase detector. The amplitude of the PWM signal, which translates to motor velocity, is adjusted based on the analog control voltage scaling circuit and motor amplitude scaling circuit inputs. This will be discussed more fully below.

The piezoelectric motor driver 500 can include a communication port 512. The communication port can provide access for digitally controlling the piezoelectric motor driver. A digital communication line can be coupled between the communication port and a digital controller, such as a computer or microprocessor. The digital controller can control a plurality of piezoelectric motor systems. The plurality of piezoelectric motors can be coupled in series, such as in a daisy chain, or in parallel along the communication line. The communication port can transmit individually addressed commands to the plurality of piezoelectric motor systems through a shared communication medium.

In accordance with one aspect of the present invention, the piezoelectric motor driver 500 can be controlled digitally through an RS-485 communication port 512, and multiple drivers 500 can be addressed and controlled through the same communication line (not shown). Alternatively, any type of digital communication means can be used to enable a user to control the motor driver 500, including serial connections, parallel connections, a universal serial bus connection, an IEEE 1394 connection, a radio frequency or optical wireless connection, and the like. Advantageously, this communication configuration may allow a user to digitally specify voltage level and/or number of cycles or steps to achieve the desired movement without the need for expensive encoders or feedback devices by calibrating the distance traveled for a given digital command. The piezoelectric motor driver 500 can be constructed using hardware, software, firmware, or any combination. An external computer, such as an application specific computing device or a general purpose computer, can be used to control the driver through the communication port using software.

The piezoelectric motor driver 500 can also include a driver dock 514. The driver dock can modify memory storage capacity by allowing connection with additional memory storage devices such as flash memory, RAM memory chips, and the like. Additionally the driver dock can modify processor speed by allowing connection with acceleration circuit boards as known in the art.

The piezoelectric motor driver 500 can have dual ac/dc voltage control. Relatively larger movements of the separate member 14 (FIG. 2) can be accomplished using ac voltage to power the piezoelectric motor 10, and more precise movement can be accomplished using dc voltage.

The piezoelectric motor driver 500 was developed with the intent of providing self-tuning operation to accommodate for motor-to-motor frequency differences and to provide active frequency tracking for use in a much larger temperature range than previously available.

In one embodiment, the motor driver input can be designed for 24±10% Vdc power input. With an input of 21.6 Vdc the driver can be operational with a voltage output of 500 Vpp to the load. An input of 26.4 Vdc may also function with an output of 550 Vpp. In order to operate more than four motors, a power supply having a greater voltage output may be needed.

The control input can be designed for a ±10 Vdc analog signal. Transformers are used to step up the input voltage. The output voltage magnitude at the motor can be proportional to the control input voltage magnitude.

In one embodiment, the maximum output voltage to the motors can be 500-550 Vpp. In the case of a one-motor load, the 24 Vdc supply voltage is adequate to achieve this voltage. Using a voltage feedback to the microprocessor, a limit can be implemented in the software to protect the motor from steady state over-voltage. A single motor load can produce a 550 Vpp output. In addition, the steady state voltage output measured for a four-motor load can produce between 520 and 530 Vpp over the bandwidth with 24 Vdc input.

It will be appreciated that various alterations and changes can be made to the driver circuit 500. The previous explanation of the driver circuit is intended as an example embodiment and is not meant to be limiting in any way.

Figure 15:
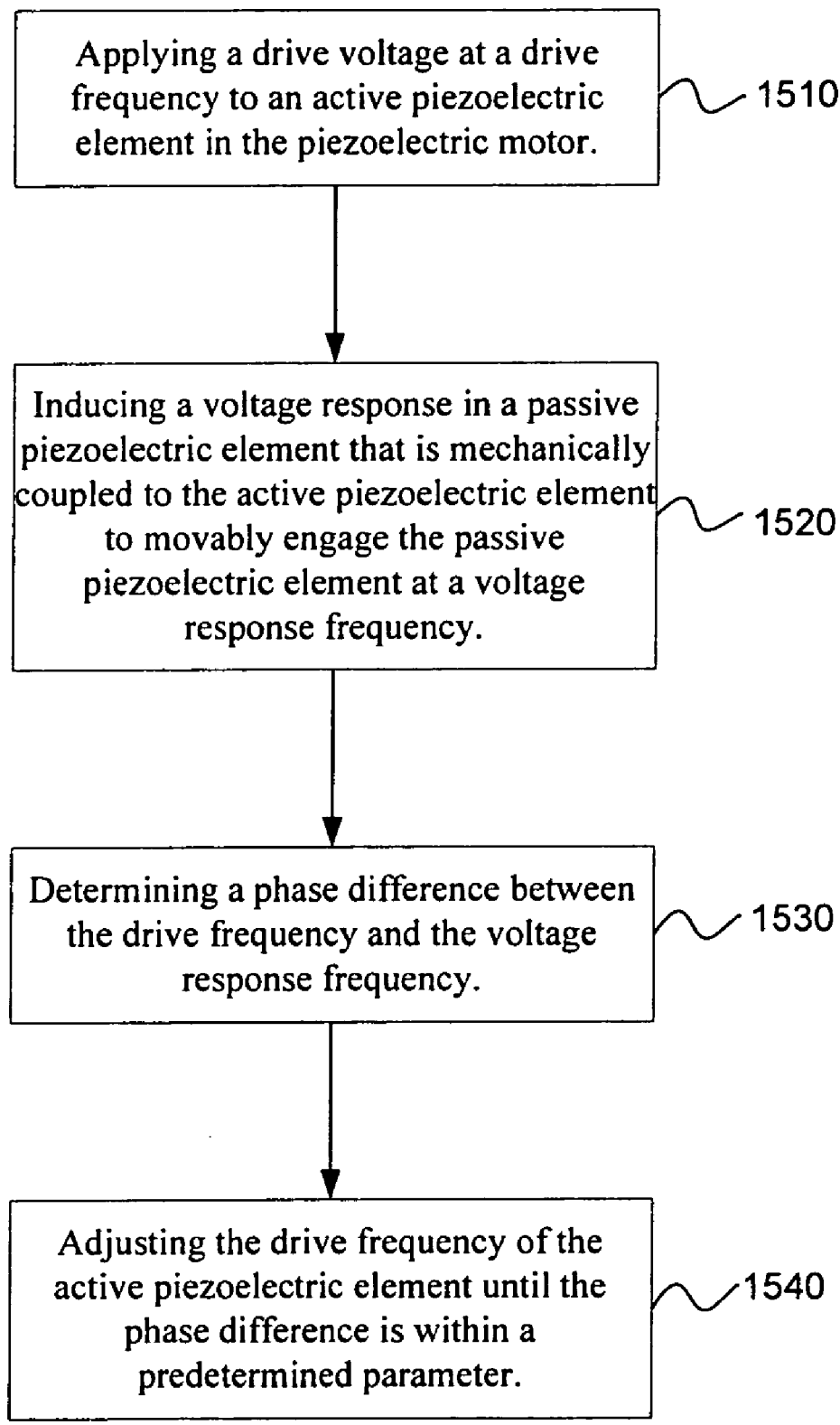
FIG. 15 is a flowchart depicting a method for actively tracking a drive frequency of a piezoelectric motor in accordance with an embodiment of the present invention.

In one embodiment, a method for actively tracking a drive frequency of a piezoelectric motor can be implemented as depicted in the flow chart in FIG. 15. The method can include the operation of applying a drive voltage at a drive frequency to an active piezoelectric element in the piezoelectric motor, as shown in block 1510. A further operation provides inducing a voltage response in a passive piezoelectric element that is mechanically coupled to the active piezoelectric element to movably engage the passive piezoelectric element at a voltage response frequency, as shown in block 1520. Another operation includes determining a phase difference between the drive frequency and the voltage response frequency, as shown in block 1530.

The phase difference can be determined by monitoring the voltage created by the passive ceramic crystal element and comparing the phase of the voltage response in the passive element to the drive voltage in the active element. A further operation provides adjusting the drive frequency of the active piezoelectric element until the phase difference is within a predetermined parameter, as shown in block 1540. A processor can adjust the drive frequency of the active element until the desired phase lag exists. In one embodiment, the maximum motor velocity can occur when this phase lag is about 70 degrees. For one type of motor, a phase lag target of 70 degrees ±5 degrees is considered optimal. The actual phase lag needed between the active and passive piezoelectric elements to achieve maximum motor velocity is dependent upon the physical characteristics of the active and passive elements, such as size, thickness, temperature, type of material from which the elements are constructed, etc. Any phase lag may be used to determine a substantially optimal operating frequency depending upon the physical characteristics of the piezoelectric motor and piezoelectric elements. For example, depending upon the piezoelectric motor and element characteristics, a substantially optimal phase lag may be between 5 and 355 degrees.

Figure 6A:
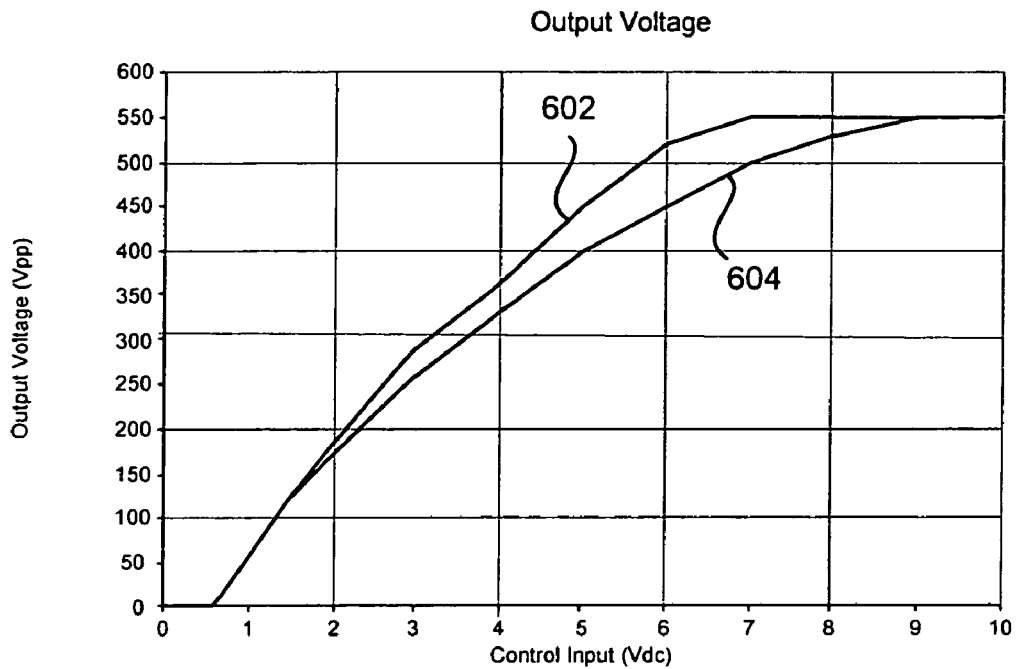
FIG. 6a is a plot of output voltage as a function of a Control Input voltage for a one motor setup and a four motor setup in accordance with an embodiment of the present invention.
Figure 6B:
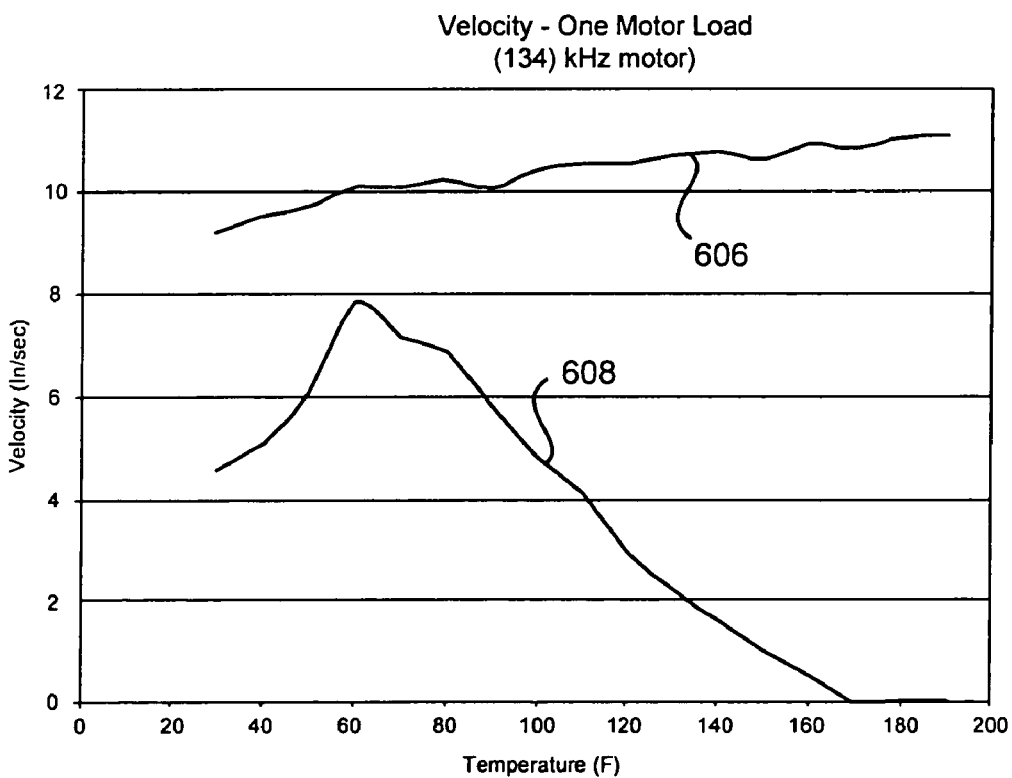
FIG. 6*b* is a plot of motor velocity as a function of temperature in accordance with an embodiment of the present invention.

Turning to FIGS. 6a and 6b, various performance and test data are illustrated in graphical form for various embodiments of the piezoelectric motor 10 (FIG. 2) and piezoelectric motor driver 500 (FIG. 5) of the present invention.

Voltage scaling can also be addressed. Since maximum effort is load dependent, 500-550 Vpp can occur at different drive levels. For example, a one-motor load 602 can reach maximum voltage at around 70% effort, corresponding to 7.0 Vdc input, as shown in FIG. 6a. Whereas, a four-motor load 604 may not reach maximum voltage until 90% effort, corresponding to 9.0 Vdc input. For substantially optimum operation, the calibration routine may be normalized. With an analog control input circuit, the calibration can be modified so that the calibration will scale the output voltage level to match the control input. The non-linear relationship shown can help compensate for non-linearities within the motor velocity. A custom voltage vs. control input curve can also be defined for further compensation.

Independent frequencies for each direction of travel within the same motor can be tracked because some motors exhibit slight frequency differences in crystals within the same motor. These separate frequencies can be stored and tracked by the software code, but tracking performance may be improved by using just one frequency.

Tuning the drive frequency by tracing the phase lag between the active and passive piezoelectric components enables the motor to output a substantially uniform velocity over a broad temperature range. FIG. 6b shows the velocity test results of a test performed on a one-motor load. The plot includes a data line 606 for the piezoelectric motor driver 500 and a data line 608 for a previous driver that does not compensate for temperature.

Velocity output, using the piezoelectric motor driver 500, can be relatively flat for the single-motor load over a broad temperature range. The test data in FIG. 6b shows the velocity changes approximately 14% across the temperature range of 30-190° F. (0-85 C) for data line 606 when the motor is operated using the piezoelectric motor driver 500. In contrast, the data line 608 for a piezoelectric motor operated using a previous driver provided less than desired results. The previous driver, tuned to operate at room temperature, shows a continuous decrease in output velocity from room temperature until the motor ceases movement at temperatures above 160° F.

FIG. 6b shows the data line 606 for the piezoelectric motor driver 500 is a vast improvement compared to previous tuning methods.

In FIGS. 7-14 flowchart diagrams are shown for one example embodiment of software used to control a piezoelectric motor driver 500. In one embodiment, the driver software can enable a push-pull pulse-width-modulated (PWM) motor-drive signal to the motor drive amplifier circuitry. The duty cycle of this PWM signal reflects a desired motor drive effort, which is communicated to the system by an analog input voltage. The polarity of this input voltage determines the direction (which of the two motor elements will be driven). The software can be used to control an analog switch to route the PWM drive signal to the proper motor element. The software enables automated determination of the drive frequency of the motor-drive signal. In order to operate in a satisfactory manner, the piezoelectric motor 10 is configured to be driven at or near its resonant frequency. In order to determine the drive frequency of the motor—and track it as it changes with motor conditions (during operation)—the phase of the non-driven motor element with respect to the driven motor element can be substantially continuously analyzed. The phase measurement provides feedback for determining whether or not the driven motor is at the desired frequency. If not, the frequency of the active piezoelectric element is adjusted until the phase measurement is within a desired tolerance, such as 70°±5°

The design of the software algorithm shown in FIGS. 7-14 accounts for a change in resonant or drive frequency of the piezoelectric elements 502 and 504 (FIG. 5) with respect to motor drive effort. Motor drive effort is measured by the amplitude of the drive signal being routed to the active piezoelectric element. In one embodiment, the amplitude can be scaled and converted from analog to digital. The amplitude can then be monitored using the digital signal processor (DSP) 510 (FIG. 5).

Figure 7:
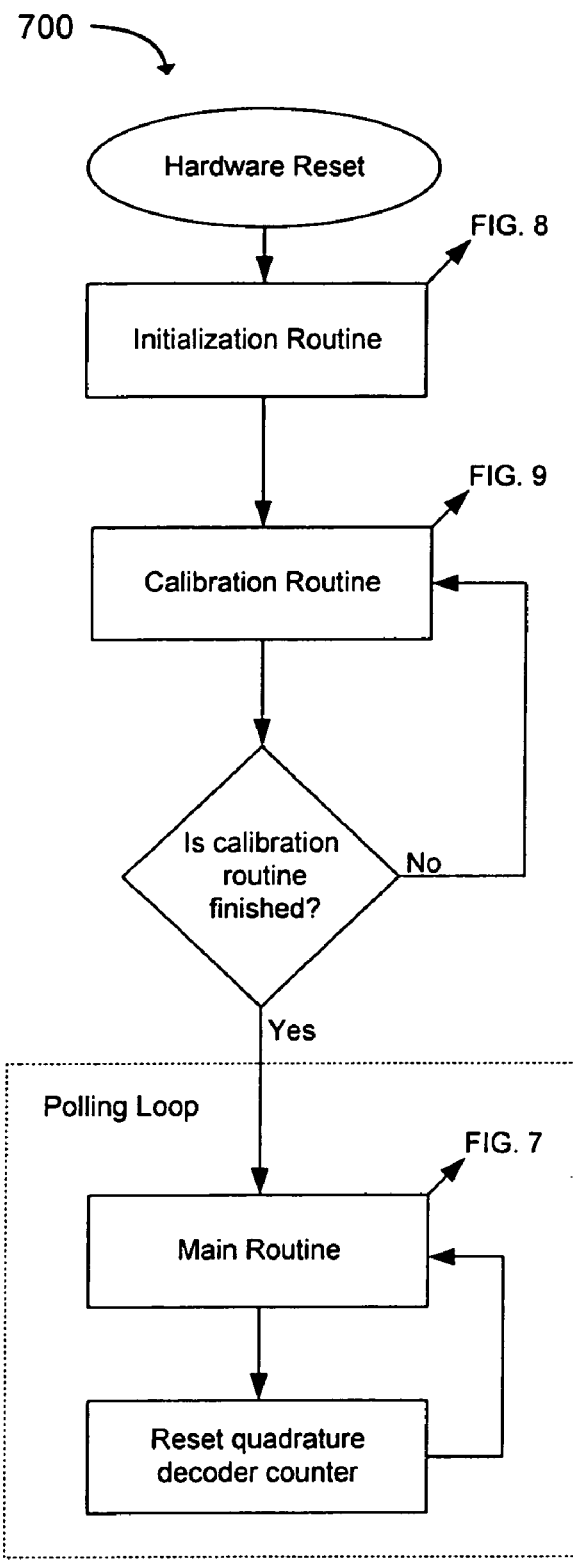
FIG. 7 is a flowchart that shows a main software routine of the piezoelectric motor driver of FIG. 5 in accordance with an embodiment of the present invention.

FIG. 7 shows a main routine 700 as a polling loop that handles all tasks in a Round-Robin fashion. Most all of the CPU's time is scheduled in this way. The only exceptions are the timer interrupts, but these are minor. Timers are used to capture duration values to measure the phase relationship. Arrows shown projecting diagonally from the blocks are used to infer a subroutine.

Figure 8:
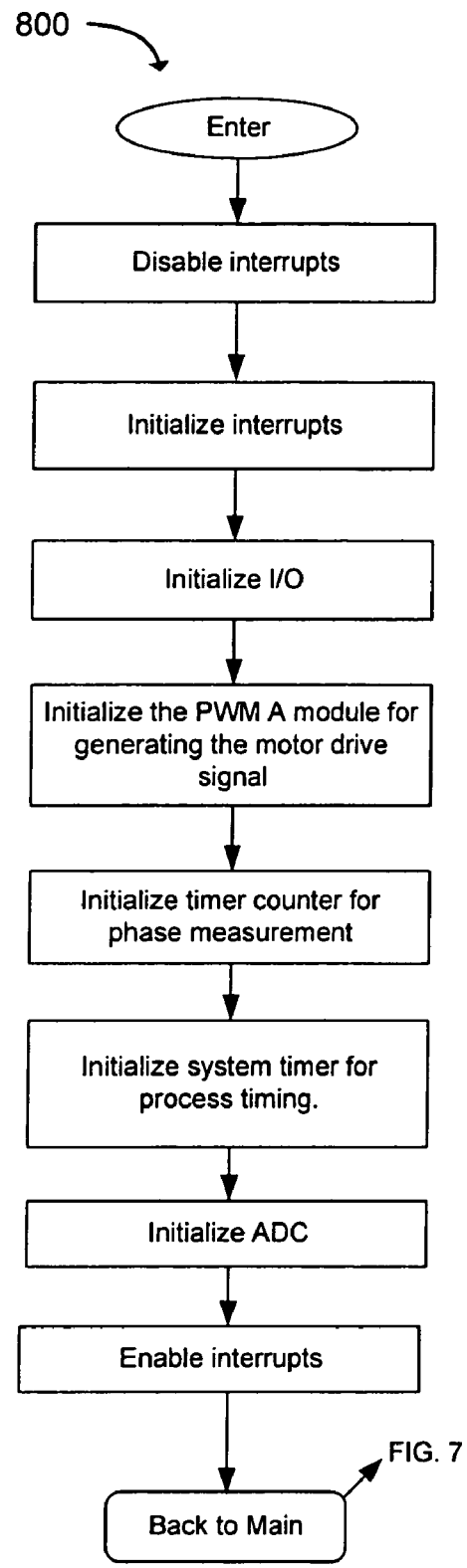
FIG. 8 is a flowchart that shows an initialization routine of the piezoelectric motor driver of FIG. 5 in accordance with an embodiment of the present invention.

FIG. 8 displays a flow chart depicting one possible Initialization routine 800. In the routine, a cycle count is reset and interrupts for timers are enabled. The PWM module is initialized, but not yet started. General-purpose I/O pins are initialized, and analog to digital conversion (ADC) is started. When all necessary hardware is enabled, then the interrupts are enabled.

Figure 9:
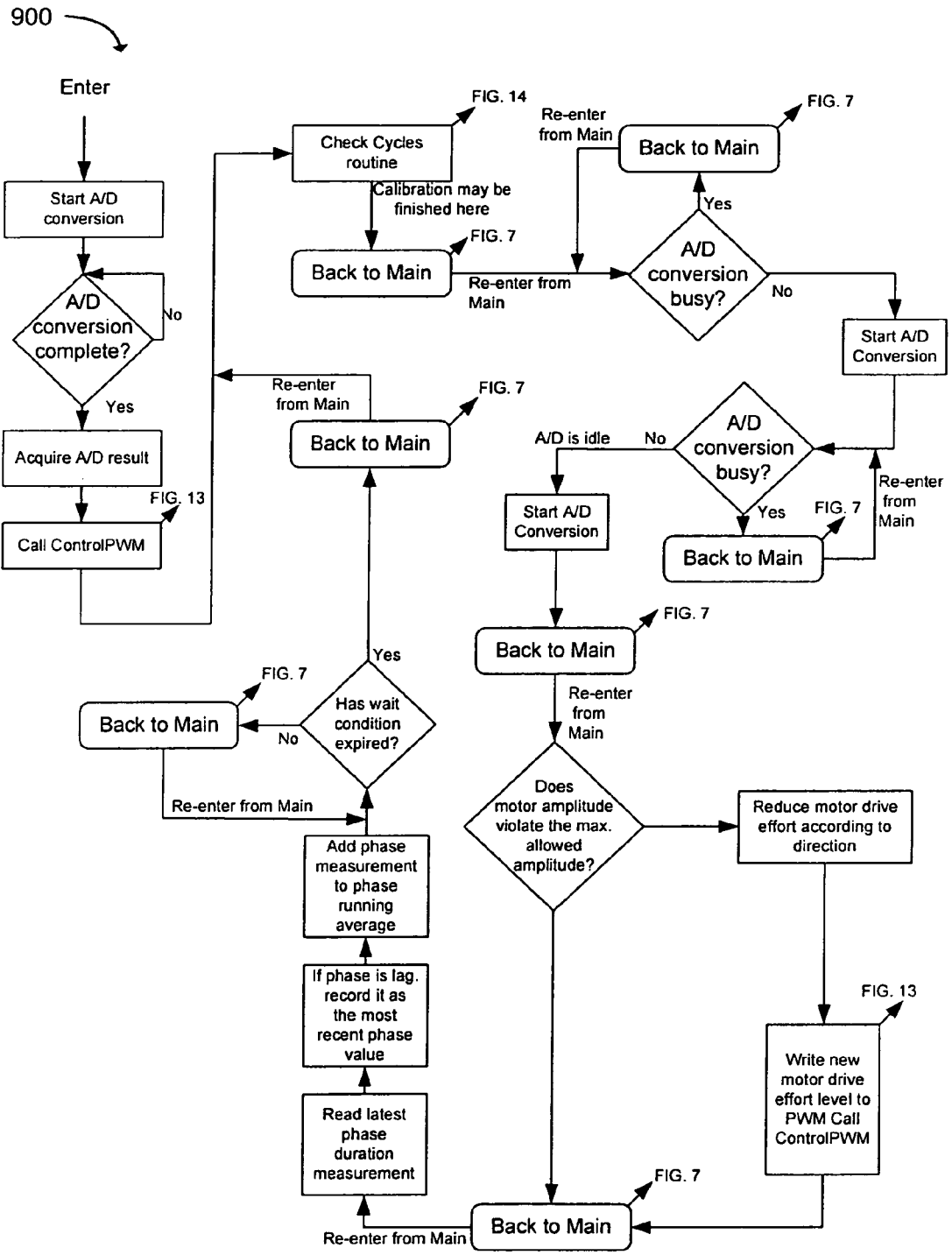
FIG. 9 is a flowchart that shows a calibration routine of the piezoelectric motor driver of FIG. 5 in accordance with an embodiment of the present invention.
Figure 13:
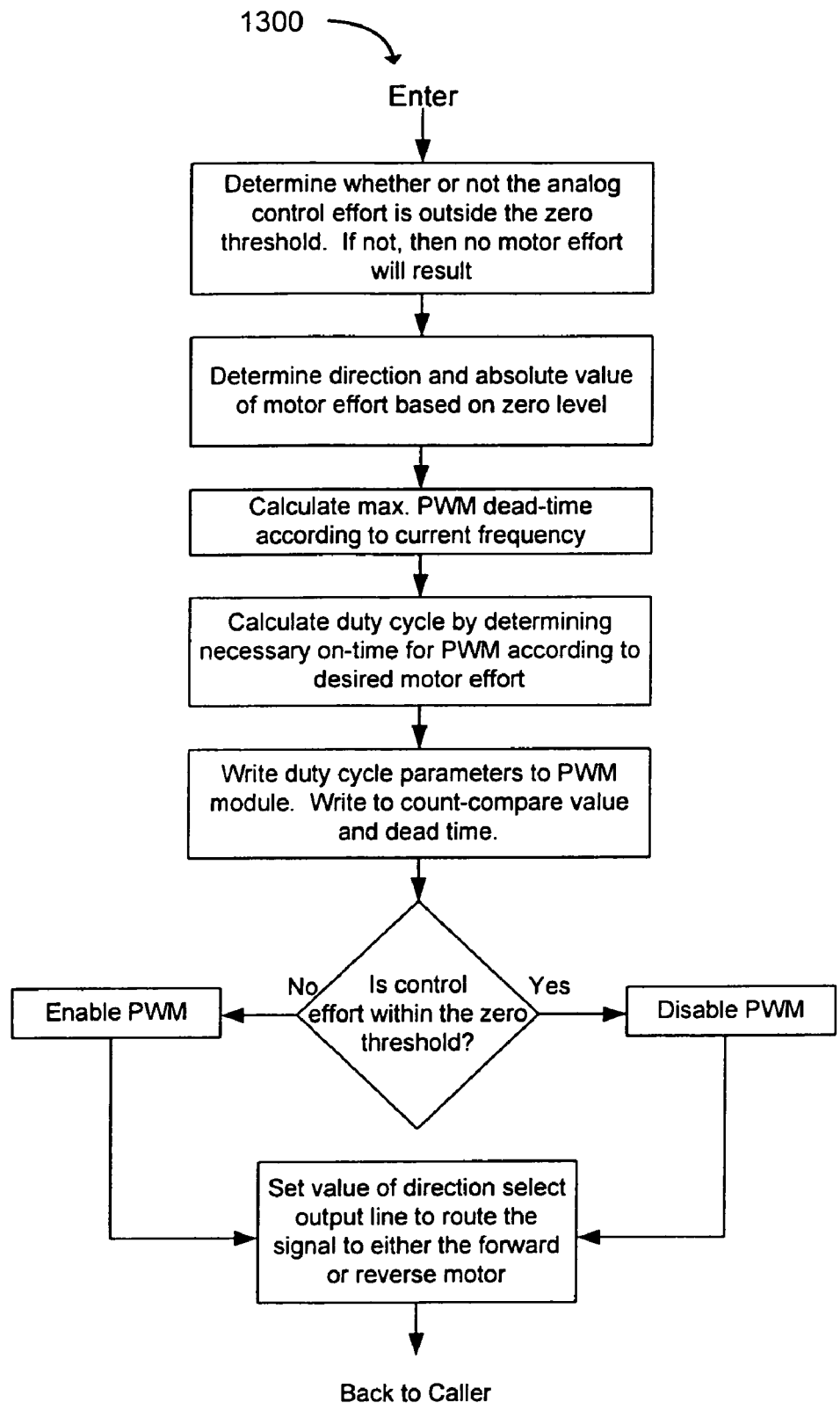
FIG. 13 is a flowchart that depicts a Control PWM routine in the routine of FIG. 7 which can be called from different locations in the code in accordance with an embodiment of the present invention.

FIG. 9 displays a Calibration routine 900 that the calibration mode is entered after the hardware is initialized, and it runs until a calibration frequency value has been determined for a different range of drive levels. In one embodiment, the calibration routine starts at a low drive level and attempts to generate a motor drive signal with an amplitude that matches the desired level. During the routine, it continually performs ADC conversions to measure the motor drive amplitude, and then adjusts the PWM drive signal accordingly. The Control PWM routine 1300 of FIG. 13 is called in order to configure the PWM properly to achieve the desired amplitude. When the proper motor effort (PWM duty cycle) is found to achieve the desired motor amplitude (based on current calibration bin number), then the frequency of the motor drive signal can be adjusted in a predetermined increment, starting at the lowest possible frequency. With each frequency setting, the phase between active and passive motors is measured and recorded. When the frequency setting reaches the highest possible frequency, then all available frequencies have been run (at a certain drive level). At this point, the frequency with the phase relationship closest to the ideal phase is saved as the desired frequency for that drive level.

Figure 10:
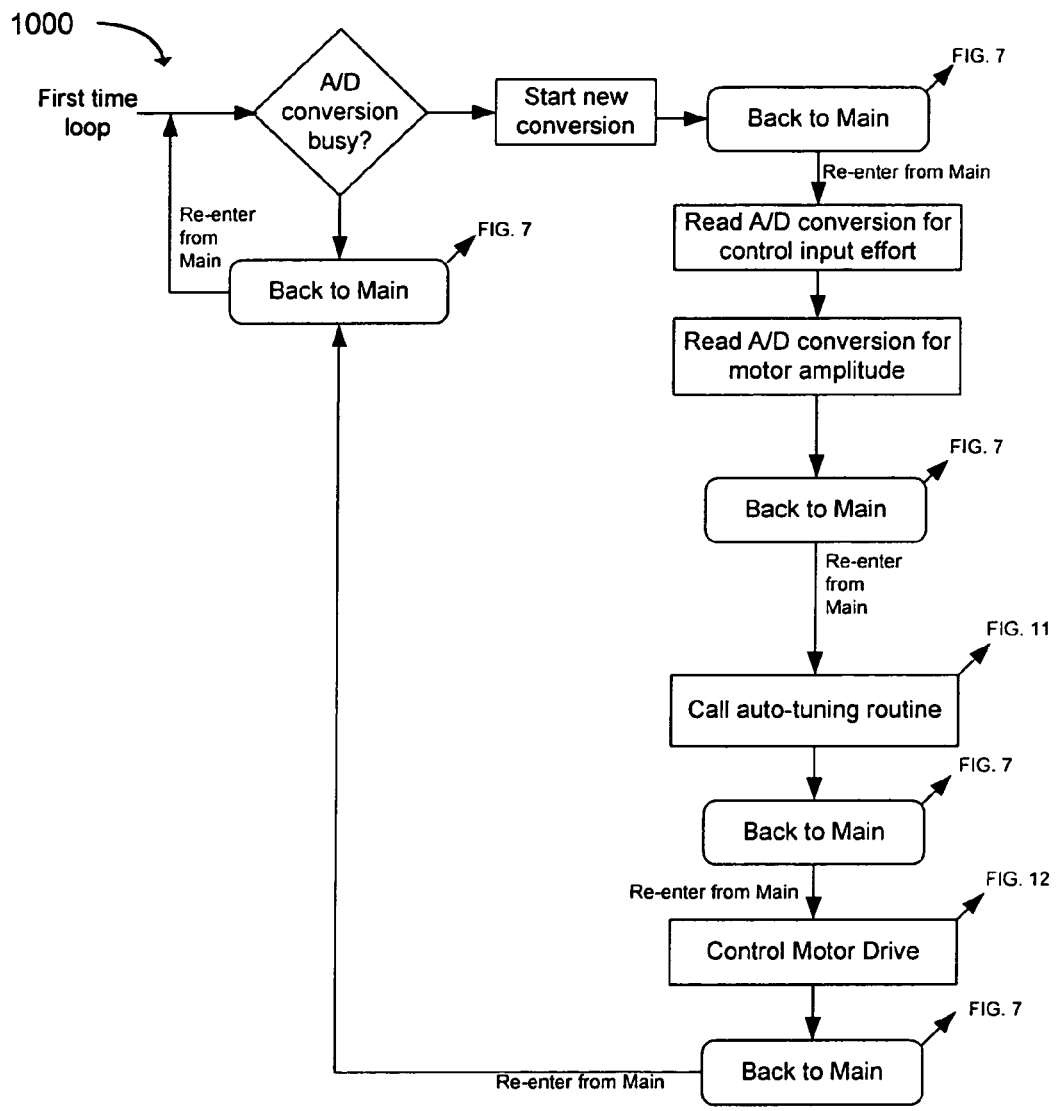
FIG. 10 is a flowchart that shows a polling loop routine of the piezoelectric motor driver of FIG. 5 in accordance with an embodiment of the present invention.

FIG. 10 shows the Polling Loop routine 1000. The flowchart displays several jumps back to the polling loop of FIG. 7. These jumps are exit and entry points. Upon return to the Main Polling Routine 700, the code returns to the "Back to Main" block from which it left on the previous visit. These frequent exits and re-entry points allow the other task(s) in the polling loop to be serviced without long delays.

Upon entering the routine 1000 of FIG. 10 for the first time, the ADC is tested to check if it is busy. If it is not busy, a new conversion is started. When the conversion is finished, the ADC result for control effort input is read. The next ADC result read is the motor amplitude. The amplitude is averaged over a number of samples, so this value is added to the running total.

Figure 11:
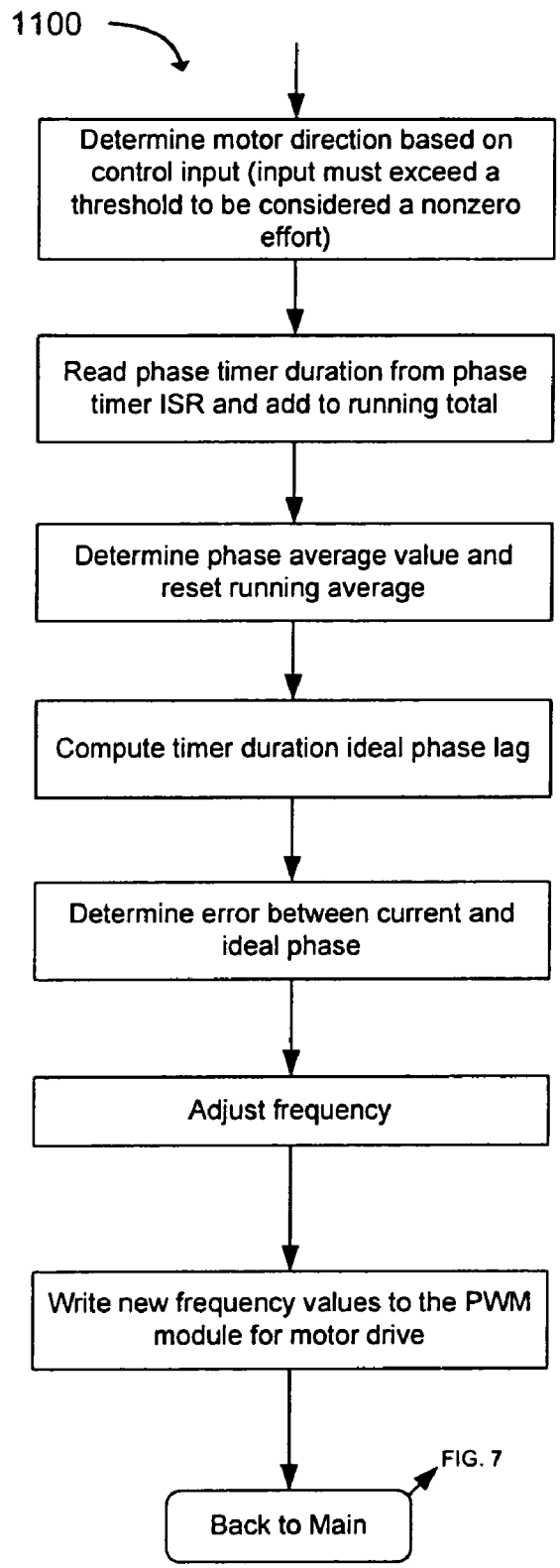
FIG. 11 is a flowchart that shows a motor auto-tuning routine of the piezoelectric motor driver of FIG. 5 in accordance with an embodiment of the present invention.
Figure 12:
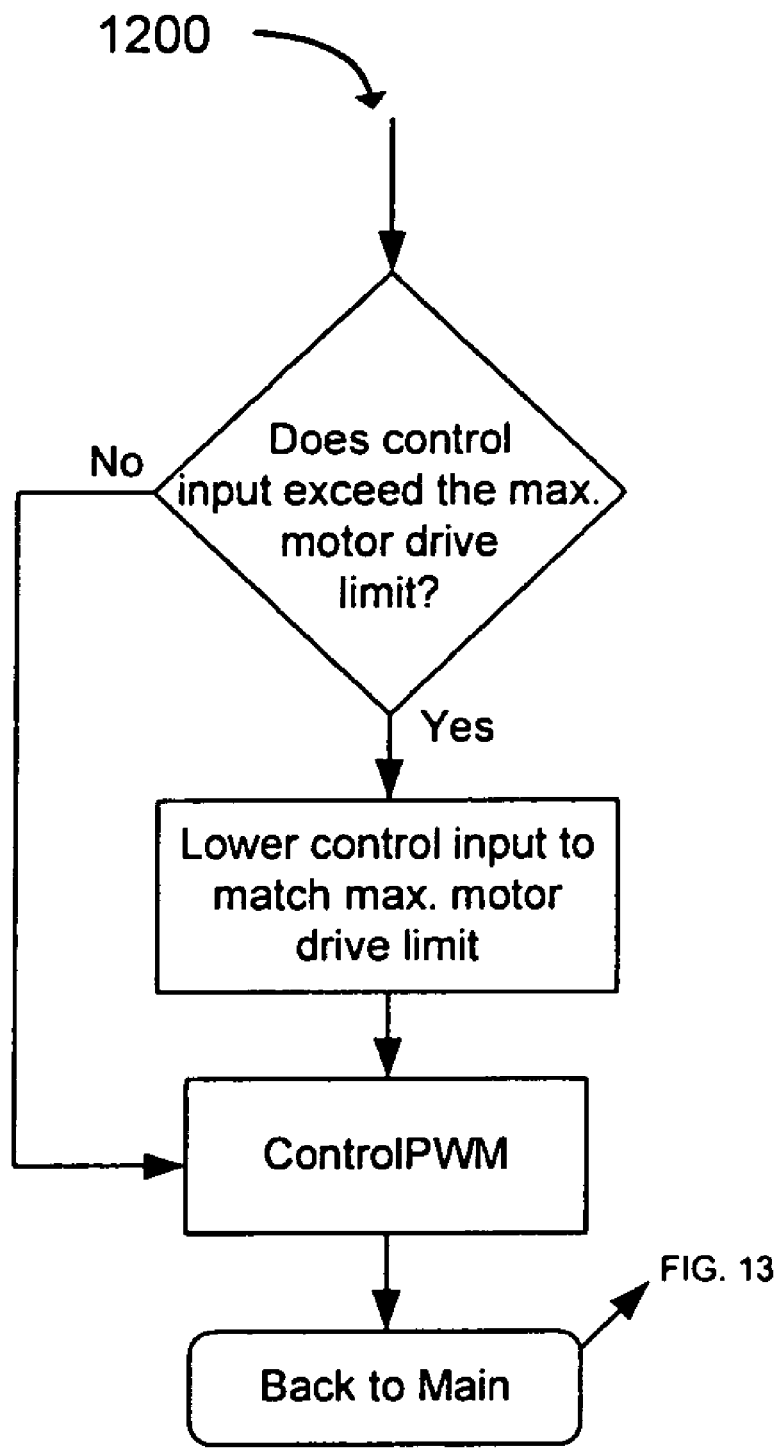
FIG. 12 is a flowchart that depicts a control motor drive routine in the routine of FIG. 10 in accordance with an embodiment of the present invention.

Using the motor amplitude, the current drive level is determined. The Motor Auto-Tuning routine 1100 of FIG. 11 is called with this drive level as a parameter. This routine controls the drive frequency in order to keep the motor substantially near its resonant frequency or desired drive frequency. After finishing this routine, the Control Motor Drive function 1200 of FIG. 12 is called, which controls the PWM waveform characteristics to reflect the desired motor effort & direction.

FIG. 11 shows the Motor Auto-Tuning routine 1100 can be used to tune the motor driving frequency so that the passive piezoelectric motor's feedback signal lags the active piezoelectric motor's drive signal by the predetermined amount of phase.

The first time the Motor Auto-Tuning routine 1100 of FIG. 11 is run, the software can start the motor drive with the frequency value that was determined to be the best choice for the current drive level. This number can be constantly updated during operation.

A phase measurement can be taken by reading the current stored in the current timer count. This timer is continually serviced by its ISR. An edge-triggered timer interrupt manages the timer counts.

If the phase is not close enough to a desired amount, then the current phase error is compared to the value from the previous check. The algorithm decides which direction to "tune" the frequency in order to achieve an improved phase. The new frequency values are written to the PWM module for motor drive, and the tuning routine is exited.

The Control Motor Drive routine 1200, shown in the flow chart of FIG. 12, enables the latest ADC result to be checked to see if the current motor amplitude is too high. After the control input is limited, the Control PWM routine 1300 of FIG. 13 is called.

The Control PWM routine 1300, as shown in FIG. 13 can be called from different locations in the code. The Control PWM routine enables the level of PWM duty cycle to drive the motor to be determined. This routine's inputs are the control effort and the motor amplitude. In normal operation, this control effort value is the A/D result of the analog input. At startup, however, the calibration routine can use this routine to control the motor voltage. In one embodiment, this control effort is an arbitrary value produced by the algorithm.

The analog voltage level is analyzed for magnitude and direction. The control effort can be varied by changing the duty cycle of the PWM signal. That is, the frequency of the PWM signal stays the same, but the amount of time between pair pulses that the signal is "off" varies. If the control effort demands maximum effort, then this off time is as short as possible. For low control efforts, the off time is substantially larger, and the result is short-duration PWM signals. The calculated on-time is written to one register in the PWM module and the off-time is written to another register.

The PWM module is enabled (it's usually set to "enable" when it is already enabled) or disabled, based on the level of the control effort input. If it is close enough to zero, then the module is disabled. The last step involved is to set the DSP's digital output to the switch that routes the motor amplifier signal to the proper motor. The setting of this switch is dependent on the direction of the control effort, which in turn controls which of the piezoelectric elements will be the active element, and which will be the passive element.

Figure 14:
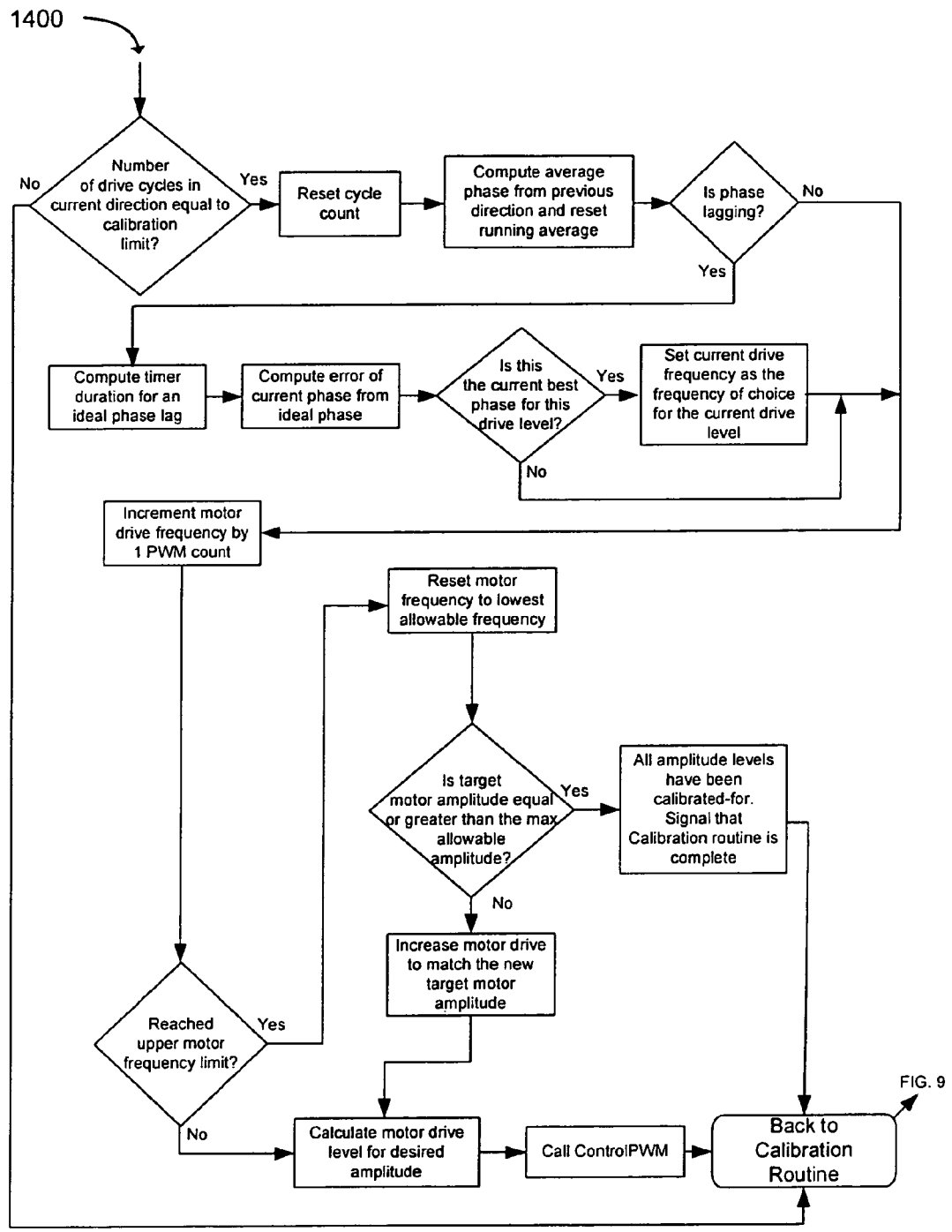
FIG. 14 is a flowchart that depicts a Check Cycles routine in the routine of FIG. 9 which can be used by the calibration routine to supervise the steps of the calibration process in accordance with an embodiment of the present invention.

FIG. 14 displays a Check Cycles routine 1400 used by the calibration routine of FIG. 9 to supervise the steps of the calibration process.

Upon entry, the check cycles routine first checks to see if the motor has been run for a desired number of cycles at the current setting. The piezoelectric motor is typically run for a certain number of cycles in order for the motor to stabilize at the current setting and to get enough cycles for a statistical base. If the desired number of cycles have been run, then the routine exits.

If enough motor cycles have run at the current motor setting, then the motor performance at this setting can now be evaluated. The cycle count is reset (for the next setting later), and an average phase is computed from the motor running at the current setting (the running total is reset for the next average). The average phase can be analyzed for a lagging characteristic. The phase magnitude is compared to see if it within a desired tolerance and any error outside the tolerance is computed.

The frequency is incremented, so that the next possible frequency can be tried as a possible motor drive frequency. The Check Cycles routine 1400 of FIG. 14 then calls the control PWM routine 1300 of FIG. 13 to write to the PWM register to produce the desired motor drive signal, and then exits.

The flow charts presented in FIGS. 14-21 represent one possible solution for controlling a piezoelectric motor driver using software, hardware, and firmware. The example is not meant to be limiting in any way. It will be appreciated that there are a number of ways to automate the measurement and adjustment of a phase difference between active and passive piezoelectric elements. The measurement of the phase difference provides a unique, efficient, and effective method for tracking a drive frequency of a piezoelectric motor and optimizing the frequency and power of the motor.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for actively tracking a drive frequency of a piezoelectric motor, comprising:
    applying a drive voltage at the drive frequency to an active piezoelectric element in the piezoelectric motor;
    inducing a voltage response in a passive piezoelectric element that is separate from and mechanically coupled to the active piezoelectric element by an engaging element to movably engage the passive piezoelectric element through the engaging element at a voltage response frequency;
    determining a phase difference between the drive frequency and the voltage response frequency;
    adjusting the drive frequency of the active piezoelectric element until the phase difference is within a predetermined parameter.

2. A method as in claim 1, further comprising scaling the drive voltage applied to the active piezoelectric element to provide a desired velocity output of the piezoelectric motor.

3. A method as in claim 2, wherein applying a drive voltage further comprises applying a pulse width modulated drive voltage.

4. A method as in claim 3, wherein scaling the drive voltage further comprises measuring the voltage response and adjusting the pulse width modulated drive voltage by changing a duty cycle of a pulse width modulation to scale the drive voltage to provide a desired velocity output of the piezoelectric motor.

5. A method as in claim 1, wherein adjusting the drive frequency further comprises adjusting the drive frequency of the active piezoelectric element until the phase difference is within 70±0.5 degrees.

6. A method as in claim 1, wherein applying a drive voltage at the drive frequency further comprises applying a drive voltage at greater than 120 KHz.

7. A method as in claim 1, wherein applying a drive voltage at a drive frequency further comprises applying a drive voltage at greater than 200 KHz.

8. A system for actively adjusting a drive frequency of a piezoelectric motor, comprising:
    an active piezoelectric element;
    a passive piezoelectric element separate from and mechanically coupled to the active piezoelectric element;
    an engaging element located between and mechanically coupled to the active piezoelectric element and the passive piezoelectric element;
    a voltage source electrically coupled to at least one of the active and passive piezoelectric elements;
    a drive voltage from the voltage source applied to the active piezoelectric element to cause the active piezoelectric element to expand and contract at a drive frequency;
    wherein the passive piezoelectric element is movably engaged by the active piezoelectric element at the drive frequency to produce a voltage response at a voltage response frequency;
    a piezoelectric motor driver configured to measure a phase difference between the drive frequency and the voltage response frequency and adjust the drive frequency until the phase difference is within a predetermined parameter.

9. A system as in claim 8, wherein the piezoelectric motor driver further comprises a drive voltage scaling circuit configured to scale the drive voltage applied to the active piezoelectric element to provide a desired velocity output of the piezoelectric motor.

10. A system as in claim 9, wherein the piezoelectric motor driver further comprises a digital signal processor configured to provide a pulse width modulated drive signal.

11. A system as in claim 10, wherein the drive voltage is regulated by changing a duty cycle of the pulse width modulated drive signal to scale the drive voltage to provide a desired velocity output of the piezoelectric motor.

12. A system as in claim 8, wherein the piezoelectric motor driver further comprises a phase detector circuit configured to measure the phase difference between the drive frequency and the voltage response frequency.

13. A system as in claim 8, wherein the drive frequency of the drive voltage is adjusted until the phase difference is within 5 degrees to 355 degrees.

14. A system as in claim 8, wherein the drive frequency of the drive voltage is adjusted until the phase difference is within 70°±5°.

15. A system as in claim 8, wherein the piezoelectric motor driver further comprises an active piezoelectric element zero-cross detector and a passive piezoelectric element zero-cross detector, the zero-cross detectors configured to determine if the phase difference between the active and passive piezoelectric elements is leading or lagging.

16. A system as in claim 8, wherein the voltage source is configured to apply the drive voltage to an electrode coupled to the active piezoelectric element.

17. A system as in claim 8, wherein the voltage source is configured to apply the drive voltage at a drive frequency between 20 KHz. and 350 KHz.

18. A system as in claim 8, wherein the piezoelectric motor driver is configured to be connected to a plurality of piezoelectric motors.

19. A system as in claim 8, further comprising a driver dock coupled to the piezoelectric motor driver and configured to modify at least one of memory storage capacity and processor speed.

20. A system as in claim 8, further comprising a communication port coupled to the piezoelectric motor driver and configured to receive communication from an external digital controller.

* * * * *